(12) United States Patent
Kim et al.

(10) Patent No.: US 8,919,833 B2
(45) Date of Patent: Dec. 30, 2014

(54) DRYING APPARATUS FOR VEHICLE USING VEHICLE INDUCED WIND

(71) Applicant: Hyundai Motor Company, Seoul (KR)

(72) Inventors: Hyun Gyung Kim, Gyeonggi-do (KR); Seung Mok Lee, Gyeonggi-do (KR); Dong Eun Cha, Gyeonggi-do (KR); Phil Jung Jeong, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 43 days.

(21) Appl. No.: 13/796,343

(22) Filed: Mar. 12, 2013

(65) Prior Publication Data

US 2014/0175823 A1 Jun. 26, 2014

(30) Foreign Application Priority Data

Dec. 21, 2012 (KP) .................. 10-2012-0150726

(51) Int. Cl.
*B60R 19/48* (2006.01)
*B60R 5/04* (2006.01)
*B60R 16/08* (2006.01)
*B60R 9/06* (2006.01)

(52) U.S. Cl.
CPC . *B60R 5/04* (2013.01); *B60R 16/08* (2013.01); *B60R 9/065* (2013.01); *D09F 60/00* (2013.01)
USPC .......................................... 293/106; 293/117

(58) Field of Classification Search
CPC ............................................... B60R 2019/486
USPC .................................................. 293/117, 106
See application file for complete search history.

(56) References Cited

U.S. PATENT DOCUMENTS

| 5,056,839 | A  | * | 10/1991 | Yoon ........................... 293/117 |
| 5,979,953 | A  | * | 11/1999 | Rinehart ...................... 293/106 |
| 6,611,991 | B2 | * | 9/2003  | Okeke et al. .................. 16/225 |
| 8,672,371 | B1 | * | 3/2014  | Russell et al. ............... 293/102 |

FOREIGN PATENT DOCUMENTS

KR 10-0838031 6/2008

* cited by examiner

*Primary Examiner* — Dennis H Pedder
(74) *Attorney, Agent, or Firm* — Edwards Wildman Palmer LLP; Peter F. Corless

(57) ABSTRACT

Disclosed herein is a drying apparatus for a vehicle using vehicle induced wind. The drying apparatus is capable of drying a wet object using vehicle induced wind generated by the driving of the vehicle. The apparatus includes a storage cover that is rotatably coupled to a rear bumper cover via a hinge module, to form a storage space between the storage cover and the rear bumper cover. In addition the apparatus includes an inlet cover that is coupled to the rear bumper cover to form an inlet passage through which the vehicle induced wind flows into the storage space when the vehicle is being driven. A plurality of outlet holes are formed in the rear bumper cover, and are configured to operate as a passage to allow air to be discharged from the storage space to an exterior of the vehicle.

5 Claims, 5 Drawing Sheets

DRYING APPARATUS FOR VEHICLE USING VEHICLE INDUCED WIND

BACKGROUND OF THE INVENTION

1. Field of the Invention

The present invention relates to a drying apparatus for a vehicle using vehicle induced wind and, more particularly, to a drying apparatus for a vehicle using vehicle induced wind, which is capable of storing a wet object in a lower space of a rear bumper and, in addition, drying the wet object using vehicle induced wind.

2. Description of the Related Art

Most conventional drying apparatuses for vehicles are configured to dry a wet object using hot air or cool air discharged from an air conditioner. As shown in FIG. 1, a storage tray 1 that stores the wet object is connected to an air duct 2 of the air conditioner. The storage tray 1 is installed within a trunk 3 that is isolated from an interior of a vehicle and is not exposed to the exterior of the vehicle.

However, the conventional drying apparatus is configured to dry a wet object using the air released from the air conditioner. The conventional drying apparatus may experience power loss due to the operation of the air conditioner, and particularly, fuel efficiency may be reduced. Further, the conventional drying apparatus may be configured to use a heat generator such as a heater to dry the wet object. However, when using the heater, the conventional drying apparatus requires a separate heat generator to be installed within the vehicle.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention provides a drying apparatus for a vehicle using vehicle induced wind, configured to dry a wet object using vehicle induced wind caused by the driving of a vehicle. The apparatus is disposed in a lower space of a rear bumper, thus preventing a loss of unnecessary power and improving fuel efficiency, and thus eliminating the required separate heater of the conventional apparatus.

The present invention specifically provides a drying apparatus for a vehicle using vehicle induced wind, including a storage cover rotatably coupled to a rear bumper cover via a hinge module, to form a storage space between the storage cover and the rear bumper cover; an inlet cover coupled to the rear bumper cover to form an inlet passage through which the vehicle induced wind flows into the storage space when the vehicle is driven; and a plurality of outlet holes formed in the rear bumper cover, and to form a passage through which the air is discharged from the storage space to the exterior of the vehicle.

The drying apparatus may further include a guide shaft rotatably mounted to the rear bumper cover; and a guide link integrally connected at a first end thereof to the storage cover, and disposed at a second end thereof on the guide shaft, to guide an opening and closing operation of the storage cover.

The hinge module may include a hinge insertion recessed protrusion integrally formed on a lower portion of the rear bumper cover; and a hinge protrusion integrally formed on a lower portion of the storage cover and rotatably inserted into the hinge insertion recessed protrusion.

A plurality of rear-bumper cover ribs and a plurality of inlet cover ribs may integrally protrude from the rear bumper cover and the inlet cover disposed in a region of the inlet passage to filter out impurities. Each of the rear bumper cover ribs and each of the inlet cover ribs may overlap at ends thereof.

As is apparent from the above description, the present invention is advantageous because vehicle induced wind is used to dry a wet object, thus preventing a loss of unnecessary power and improving fuel efficiency, and in addition, the apparatus does not require a separate heat generator, thus achieving a cost reduction. In addition, a storage space of the drying apparatus is disposed in a lower space of a rear bumper corresponding to an unused space of the vehicle, thus enhancing space utilization and thereby improving practicality and increasing marketability.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF PREFERRED EMBODIMENTS

Figure 1:
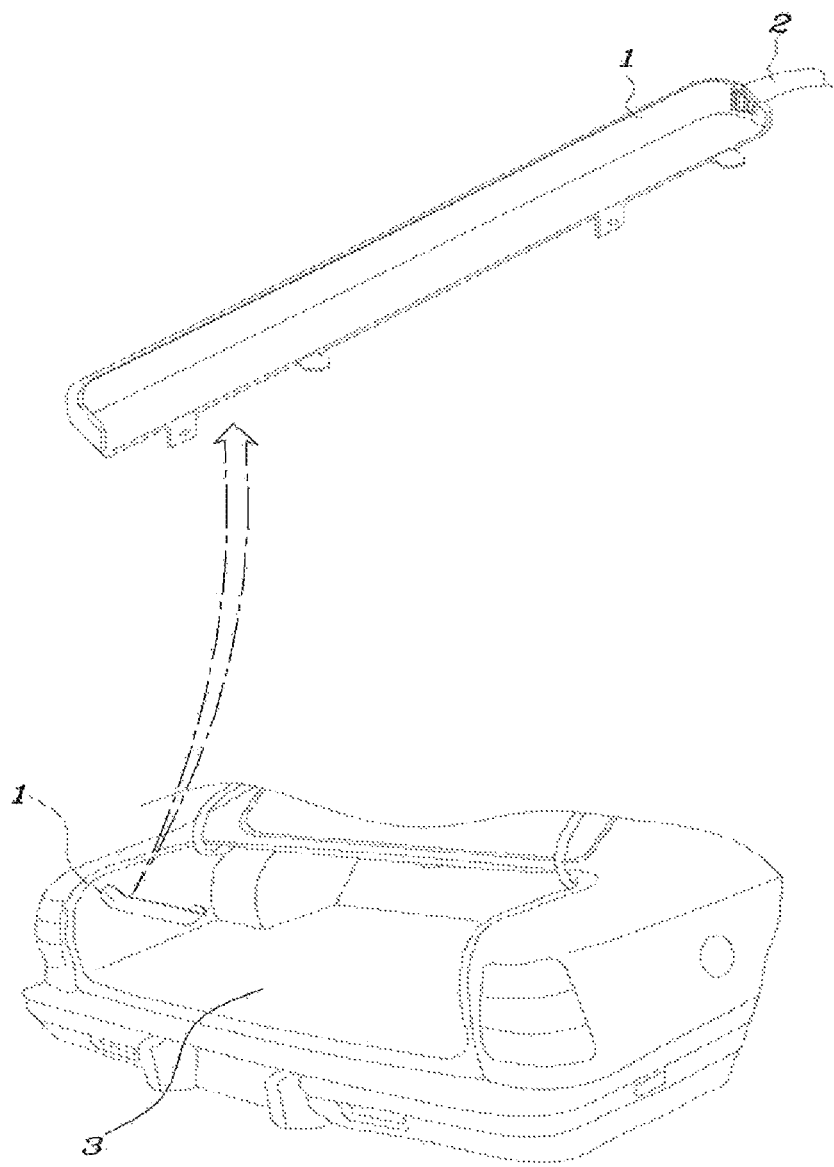
FIG. 1 is an exemplary view illustrating a conventional drying apparatus for a vehicle according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Hereinafter, a drying apparatus for a vehicle using vehicle induced wind according to exemplary embodiments of the present invention will be described with reference to the accompanying drawings.

The drying apparatus for the vehicle according to the present invention is configured to use vehicle induced wind. As shown in FIGS. 2 to 5, the drying apparatus may include a storage cover 14, an inlet cover 16, and a plurality of outlet holes 17. The storage cover 14 may be rotatably coupled to a rear bumper cover 11 via a hinge module 13, thus forming a storage space 12 between the storage cover 14 and the rear bumper cover 11. The inlet cover 16 may be coupled to the rear-bumper cover 11 to form an inlet passage 15 through which the vehicle induced wind shown by arrows M1 flows into the storage space 12 when the vehicle is being driven. The plurality of outlet holes 17 may be formed in the rear bumper cover 11, allow air to be discharged from the storage space 12 to the exterior of the vehicle.

Figure 2:
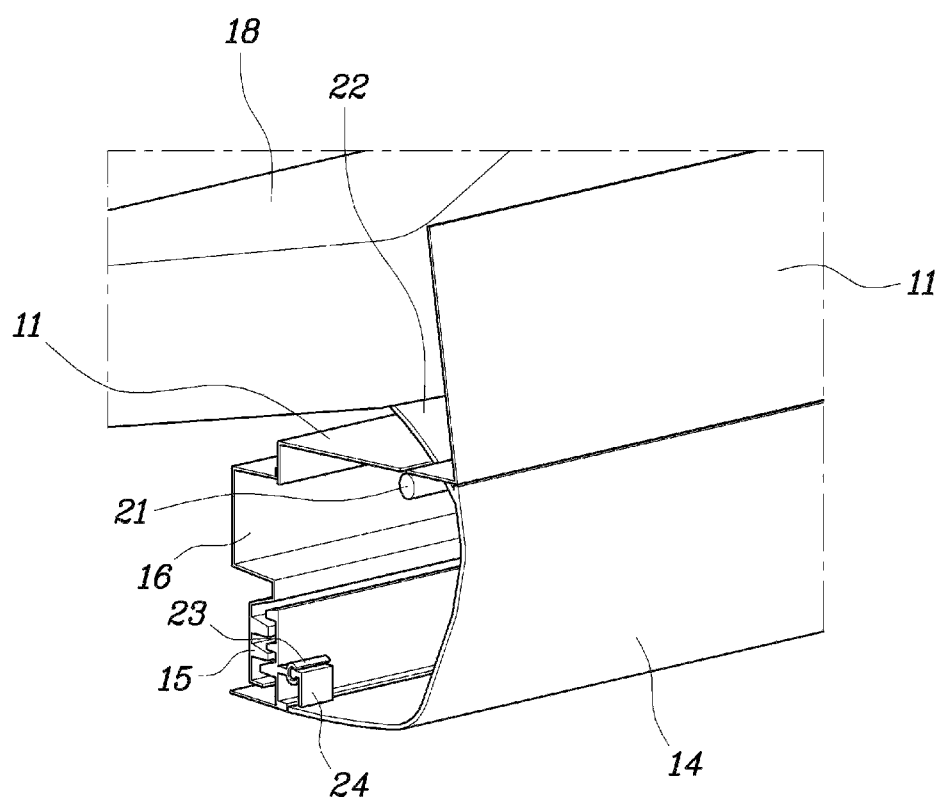
FIGS. 2 and 3 are exemplary views showing a drying apparatus for a vehicle using vehicle induced wind when the storage cover is closed according to an exemplary embodiment of the present invention.
Figure 3:
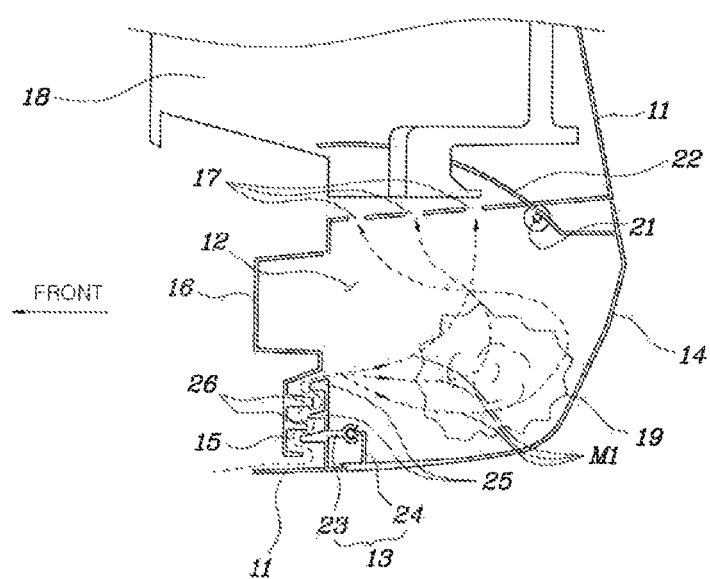
Figure 4:
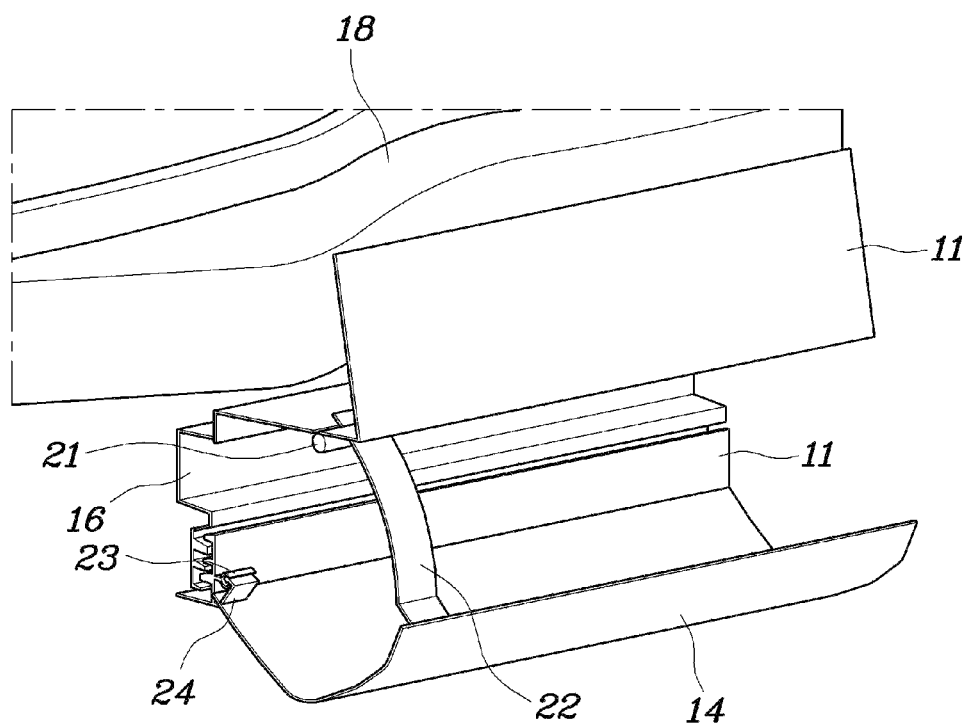
FIGS. 4 and 5 exemplary views showing the drying apparatus when the storage cover is open according to an exemplary embodiment of the present invention.
Figure 5:
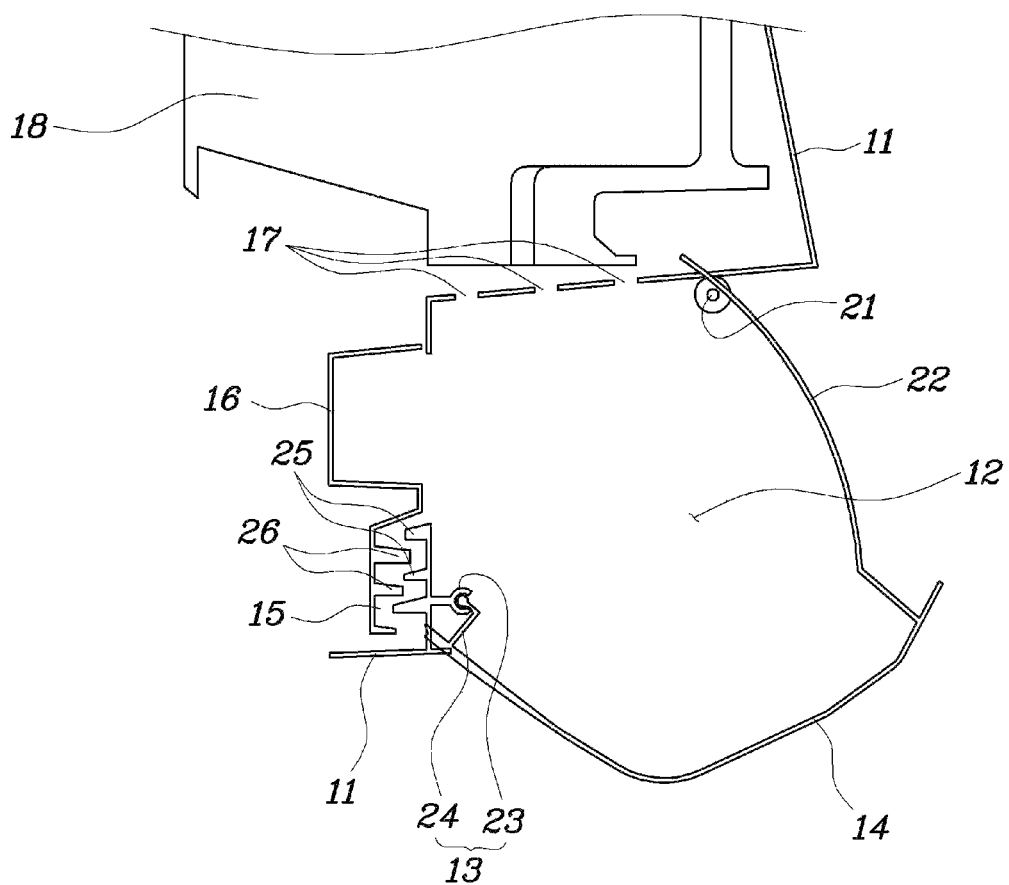

In FIGS. 2 and 3, reference numeral 18 denotes a rear bumper beam, and reference numeral 19 denotes a wet object 19 stored in the storage space 12.

When the vehicle is being driven, the vehicle induced wind may be introduced into the storage space 12 through the inlet passage 15, the wet object 19 stored in the storage space 12 may be dried using the vehicle induced wind, and the vehicle induced wind used to dry the object 19 may be discharged through the outlet holes 17 to the exterior of the vehicle.

The movement of the vehicle induced wind which may be introduced into the storage space 12 through the inlet passage 15 and may be discharged from the storage space 12 through the outlet holes 17 to the exterior is performed by a pressure difference as the wind moves through the storage space.

Meanwhile, the embodiment of the present invention may further comprise a guide shaft 21 which may be rotatably mounted to the rear bumper cover 11, and a guide link 22 which may be integrally connected at a first end thereof to the storage cover 14 and may be disposed at a second end thereof on the guide shaft 21. In addition, two guide links 22 may be formed on left and right ends of the storage cover 14, respectively. However, the invention is not limited thereto.

When the storage cover 14 is in a closed position as shown in FIGS. 2 and 3, the guide link 22 may make contact with the guide shaft 21 to bear a load of the storage cover 14. Further, when the storage cover 14 performs an opening and closing operation, the guide link 22 may be configured to guide the opening and closing operation of the storage cover 14.

The hinge module 13 may include a hinge insertion recessed protrusion 23 which may be integrally formed on a lower portion of the rear bumper cover 11, and a hinge protrusion 24 which may be integrally formed on a lower portion of the storage cover 14 and may be rotatably inserted into the hinge insertion recessed protrusion 23. A plurality of hinge modules 13 may be disposed in a direction from the left to the right of the rear bumper cover 11 and the storage cover 14.

Further, to prevent impurities from entering the storage space 12 when the vehicle induced wind flows through the inlet passage 15 into the storage space 12, the inlet passage 15 may operate as a filter to prevent the entry of impurities. In particular, a plurality of rear bumper cover ribs 25 and a plurality of inlet cover ribs 26 may integrally protrude from the rear bumper cover 11 and the inlet cover 16 may be disposed in a region of the inlet passage 15. To maximize a filtering effect, each of the rear bumper cover ribs 25 and each of the inlet cover ribs 26 may overlap each other at ends thereof.

The drying apparatus according to the present invention may further include a locking mechanism to maintain a closed position of the storage cover 14. The locking mechanism may use a door lock having a latch and a striker, as an example.

As described above, the present invention provides a drying apparatus for a vehicle using vehicle induced wind, which is configured to dry a wet object using vehicle induced wind caused by the driving of a vehicle. The present invention eliminates the need of a separate heat generator such as a heater as in the related art, thus preventing a loss of unnecessary power and improving fuel efficiency.

Further, the present invention provides a drying apparatus for a vehicle using vehicle induced wind, which may efficiently utilizes a lower space of a rear bumper corresponding to an unused space of the vehicle, thus enhancing space utilization and thereby improving practicality and increasing marketability.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A drying apparatus for a vehicle using vehicle induced wind, comprising:
    a storage cover rotatably coupled to a rear bumper cover via a hinge module, to form a storage space between the storage cover and the rear bumper cover;
    an inlet cover coupled to the rear bumper cover to form an inlet passage through which the vehicle induced wind flows into the storage space when the vehicle is being driven; and
    a plurality of outlet holes formed in the rear bumper cover, and configured to operate as a passage to allow air to be discharged from the storage space to an exterior of the vehicle,
    wherein the inlet passage is formed to open toward a front direction of the vehicle between the storage cover and the inlet cover.

2. The drying apparatus as set forth in claim 1, further comprising:
    a guide shaft rotatably mounted to the rear bumper cover; and
    a guide link integrally connected at a first end to the storage cover, and disposed at a second end to the guide shaft, to guide an opening and closing operation of the storage cover.

3. The drying apparatus as set forth in claim 1, wherein the hinge module includes:
    a hinge insertion recessed protrusion integrally formed on a lower portion of the rear bumper cover; and
    a hinge protrusion integrally formed on a lower portion of the storage cover and rotatably inserted into the hinge insertion recessed protrusion.

4. The drying apparatus as set forth in claim 1, wherein a plurality of rear bumper cover ribs and a plurality of I nlet cover ribs integrally protrude from the rear bumper cover and the inlet cover disposed in a region of the inlet passage to filter impurities.

5. The drying apparatus as set forth in claim 4, wherein each of the rear bumper cover ribs and each of the inlet cover ribs overlap each other at ends thereof.

* * * * *